United States Patent
Glasgow

[11] 3,945,011
[45] Mar. 16, 1976

[54] RADAR SYSTEM EMPLOYING CONSECUTIVE PULSES ONLY ONE OF WHICH IS FREQUENCY SWEPT

[75] Inventor: John Arthur Glasgow, Chelmsford, England

[73] Assignee: The Marconi Company Limited, Chelmsford, England

[22] Filed: Oct. 10, 1974

[21] Appl. No.: 513,812

[30] Foreign Application Priority Data
Nov. 13, 1973 United Kingdom................ 52548/73

[52] U.S. Cl. .......................................... 343/17.2 PC
[51] Int. Cl.² .............................................. G01S 9/233
[58] Field of Search .............................. 343/17.2 PC

[56] References Cited
UNITED STATES PATENTS
3,866,223   2/1975   Crooke ......................... 343/17.2 PC

*Primary Examiner*—T. H. Tubbesing
*Attorney, Agent, or Firm*—Baldwin, Wight & Brown

[57] ABSTRACT

A radar system is described in which a transmitter transmits two consecutive pulses only one of which is frequency swept and in which a receiver has two channels, one for non-swept pulses reflected from short range targets and the other for swept pulses from long range targets.

7 Claims, 2 Drawing Figures

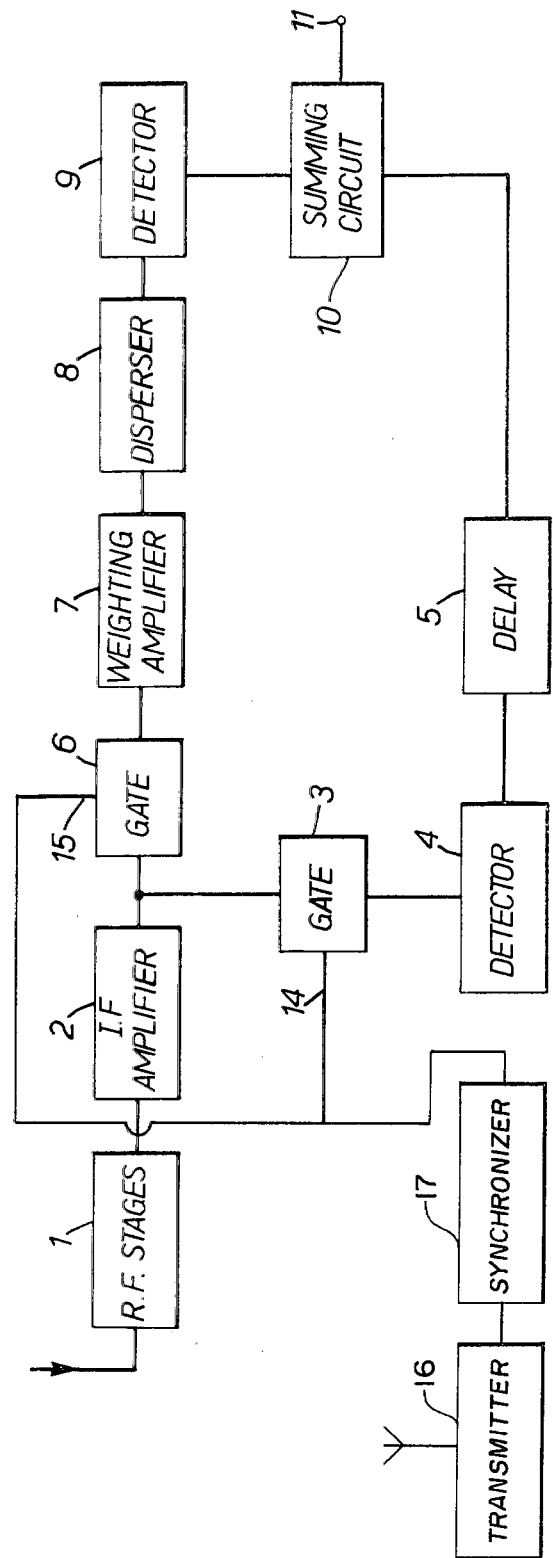
FIG. I.

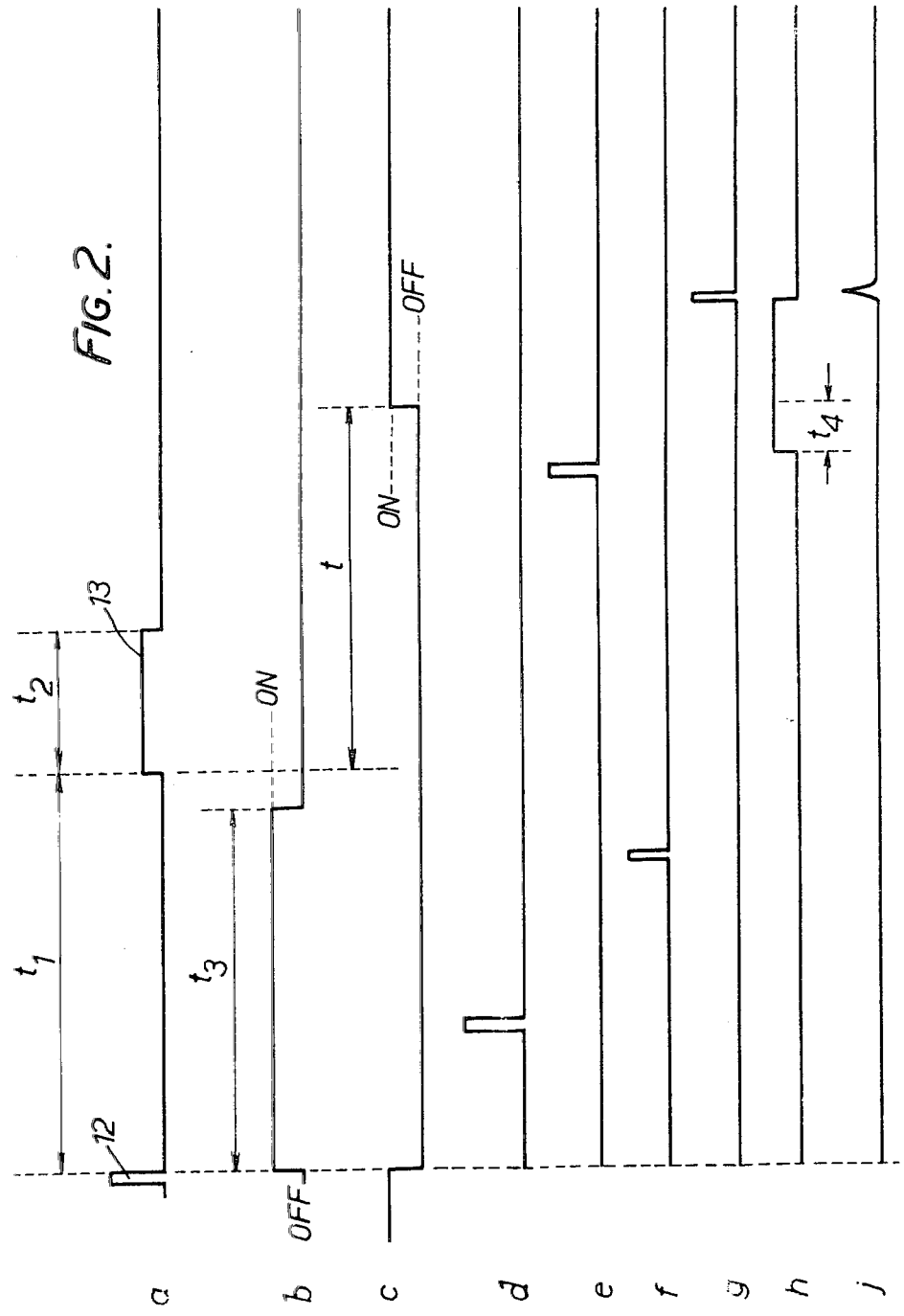

RADAR SYSTEM EMPLOYING CONSECUTIVE PULSES ONLY ONE OF WHICH IS FREQUENCY SWEPT

This invention relates to radar systems, and in particular to the type of system which utilizes pulse compression. It is known that in order to obtain, after compression, a signal in which the range sidelobes are 30 dB or more below the level of the main pulse, it is essential that the gain of all stages prior to the compression network be substantially linear. In other words all stages prior to the compression network must operate at lower levels than that at which limiting or non-linearity occurs.

If limiting does occur to any extent, then the effect on the pulse compressed output of a small signal only slightly displaced in range from a clutter signal is to produce two signals equispaced in time about the clutter signal, one of the two signals being at the correct range relative to the clutter the other signal being a ghost image and each representative of half the signal energy.

Now the received power $P_R$ at the receiving aerial is given by the equation $$P_R = \frac{P_t G^2 \lambda^2 o-h}{(4\pi)^3 R^4} \qquad (1)$$

Where
- $P_t$ = transmitted power
- $G$ = antenna gain
- $\lambda$ = operating wavelength
- $o-$ = radar cross-section of target or clutter
- $h$ = overall efficiency
- $R$ = target or clutter range By rearranging this equation the ratio of transmitted to received power and hence the path attenuation may be found. This is given by:

$$\frac{P_t}{P_R} = \frac{(4\pi)^3 R^4}{G^2 \lambda^2 o-h} \qquad (2)$$

Considering a typical radar having
a. a minimum working range of 1 Km
b. an aerial gain of 30 dB
c. an overall efficiency of 10%
d. working at L band where the largest clutter scatterer may have an effective radar cross section of 1000M² then the attenuation from transmitter to the clutter scatterer and back to the receiver will be approximately 86 dB.

Limiting at the receiver usually commences at an input level of about −70 dBW which level is substantially independent of the radar operating band, being characteristic of the mixer diode and local oscillator power, which is usually set for low noise performance. Thus limiting will commence at transmitted power levels of 16 dBW or more which is about 40 watts peak power. Such a power level is extremely low since for longer ranges transmitted powers of up to 5MW may be required.

One known way of overcoming the limiting problem is to sweep the gain of the amplifiers in which limiting occurs so as to amplify signals returned from close range targets considerably less than those signals returned from targets at longer range. Since limiting may occur at the first mixer, the swept gain must be applied to the microwave parts of the receiver.

The required law of gain versus range is known to be 40 log $R$. However due to the length $\tau$ of the swept pulse used in pulse compression, the term $R$ must be replaced at any instant, $t$ by the expression ½c $(t-\tau)$ where $c$ is the velocity of electromagnetic waves. At short ranges where t is only slightly greater than $\tau$, the required rate of change of gain is very rapid. This rapid change would cause a weighting of the clutter and signal spectrum in favour of frequencies associated with the tail of the swept pulse. This weighting change would effect the spectral weighting later employed to reduce range sidelobes. A filter can be used to removed this unrequired weighting but the filter frequency response would require sweeping in synchronism with the swept gain. In addition the phase response of the filter would be required to be fixed and invariant during the sweep. The problems involved in such an arrangement of swept gain are so great as to render the realisation impracticable.

An alternative method of preventing limiting is to increase the power fed from the local oscillator to the mixer when handling signal reflections from close range targets. Although by this procedure the noise figure of the receiver is deteriorated, this can be tolerated at short ranges since clutter reflections predominate over front end thermal noise. This arrangement does have the disadvantages that a local oscillator having a higher power output than is easily obtained is required in order to achieve the necessary range of adjustment and also the attenuator required to obtain the variation is subject to the same stringent phase requirement as an attenuator positioned in the signal channel. This invention seeks to provide a radar system in which the above mentioned disadvantages are mitigated.

According to this invention a radar system comprises a transmitter for transmitting two consecutive radar pulses, which are separated by a predetermined interval only one of said pulses being frequency swept and a receiver having a first channel for processing non-swept pulses and providing signals indicative of targets in a first range zone and a second channel for processing the swept pulses and providng a pulse compressed signal indicative of targets in a second range zone.

Advantageously the first range zone includes all ranges from zero up to a predetermined range, and the second range zone includes all ranges greater than said predetermined range up to a predetermined maximum range of observation.

According to a feature of this invention a receiver, for use in a radar system in which a transmitter transmits two consecutive radar pulses which are separated by a predetermined interval only one of said pulses being frequency swept, comprises a first channel for processing non-swept pulses and providing signals indicative of targets in a first range zone and a second channel for processing the swept pulses and providing a pulse compressed signal indicative of targets in a second range zone.

Preferably each channel is provided with switching means in the signal path so as to ensure that each channel only processes signals received from targets in the appropriate range zone.

Conveniently all R.F. stages in the receiver are common to said first and second channels.

Advantageously the signals provided by the first and second channels are combined to provide a single output signal which may be fed to any suitable display or further signal processing arrangement known per se.

Preferably signal delays in the first and second channels are arranged so that the single combined output signal provides a continuous range indication.

This invention will now be described in more detail with reference to the accompanying drawings in which:

FIG. 1 shows a schematic block diagram of the receiving stages of a radar system embodying this invention, and FIG. 2 is an explanatory diagram of the operation of the system.

Referring to FIG. 1 the receiver comprises two receiving channels, the first channel for processing target reflections from transmitted non-swept radar pulses and including R.F. amplifying and mixer stages 1 followed by I.F. amplifier 2, the output of which is connected via a gate circuit 3 to a detector 4. The output of the detector 4 is connected to the input of a delay line 5, the output of the delay line providing the output of the first receiving channel.

The second channel is a pulse compression receiving channel and includes R.F. and I.F. stages 1 and 2 which are common to the two channels, a gate circuit 6, weighting amplifier 7, disperser 8 and detector 9.

The output of the two channels provided respectively by delay line 5 and detector 9 are connected each to a respective input of a summation circuit 10 the output of which is provided at terminal 11, which may be connected to any suitable display apparatus (not shown) and which for the purposes of this description will be assumed to be a P.P.I. radar display.

The construction and mode of operation of the signal processing stages of each of the two channels taken separately are well known to those skilled in the art and require no further explanation here.

The operation of the system will now be described with the aid of FIG. 1 and explanatory FIG. 2.

A transmitter 16 is arranged to transmit two consecutive radar pulses 12 and 13 shown at line 'a' of FIG. 2, separated by an interval of time $t_1$, the first pulse 12 being a short non-swept pulse of width typically $50^{ns}$ and the second pulse 13 a frequency swept pulse of width $t_2$, chosen in dependence upon the maximum required range of observation of the radar system and the operating parameters of the dispersive receiving channel. Many known transmitter designs with a driven output tube are suitable for the transmission of the above mentioned pulse train and therefore no detailed discussion of the construction and operation of such a transmitter will be given here.

The short non-swept pulse 12 is transmitted for the purposes of detecting targets from zero range up to a predetermined maximum range, which for the purposes of explanation will be assumed to be 10 Km. Reflections from targets in this range zone will be received over a period of time which commences immediately after transmission of the pulse 12 and therefore the first receiving channel must be operative to receive signals over this period of time. To achieve this a signal is supplied to terminal 14 of gate 3 from a synchronizing unit 17, to open the gate 3 to the passage of received signals.

The interval $t_1$, between the transmission of the short pulse 12 and the commencement of transmission of the longer frequency swept pulse 13 is chosen to allow sufficient time for reflections to be received from targets at all ranges from zero up to the maximum range for which detection by the short non-swept pulse is adequate, i.e., in this example up to 10 Km and during this period $t_3$ $t_1$, the gate 3 is maintained open and the gate 6 closed. This is shown at lines $b$ and $c$ of FIG. 2.

After reflections have been received from all targets at distances up to 10 Km, the gate 3 is closed and the frequency swept pulse 13 is transmitted for a period of time $t_2$. The frequency swept pulse is intended for detection of targets at ranges greater than the maximum range for which the short non-swept pulse is intended, i.e., in this example, greater than 10 Km. Reflections will be received from nearby targets almost immediately after the commencement of transmission of the pulse 13 but since such targets are not of interest to the swept pulse receiver, having already been detected by the pulse 12, the gate 6 is maintained closed until such times as reflections are received from targets at ranges greater than 10 Km.

At a time $t$, after the commencement of transmission of the pulse 13, a synchronizing signal is applied to the terminal 15 of the gate 6 to open said gate for the passage of received swept pulses. As is well known, each received swept pulse is time compressed in the disperser to produce a narrow compressed pulse at a time slightly later than the time of arrival of the trailing edge of the received swept pulse.

It can be seen by applying equation (2) for the increased range of say 10 Km that with this arrangement the previously discussed difficulties which arise when using a single pulse compression radar are substantially overcome.

At short ranges, i.e., up to 10 Km, where limiting in the R.F. stages of a pulse compression receiver is a severe problem, the pulse compression channel is inoperative, target detection being obtained by means of a pulse radar using comparatively short non-swept pulses and in which front end limiting is of negligible consequence. At long ranges for which limiting does not occur, the pulse compression channel is effective and the advantages of pulse compression for high resolution at long ranges are achieved, the non-swept pulse channel being inoperative.

As so far described, each signal channel provides a separate output signal. It is advantageous if a single signal is provided for the P.P.I. display so that a continuous range indication can be given, an operator being substantially unaware when a change over from one receiving channel to the next occurs. To achieve this a delay line 5 is inserted in the signal path of the first channel and the outputs of the delay 5 and the detector 9 corresponding to the outputs of the two channels are fed to respective terminals of a summing circuit 10 which provides a single combined output at terminal 11. Assuming no signal delays other than caused by the disperser 8, the delay 5 must be of interval $t_1 + t_2$ to provide a continuous range indication from the summing circuit 10. The effect of the delay is to offset the zero of the P.P.I. display to correspond to the tail of the transmitted frequency swept pulse 13.

By way of example, the operation of the invention will be briefly considered for several ranges by reference to lines $d$ to $j$ of FIG. 2. Line $d$ shows a received reflection of pulse 12 corresponding to a target at approximately 4 Km. An output from terminal 11 is obtained after a delay due to the delay line 5 and is shown at line *e*. For the range of 4 Km, only the first channel is operative and only a single output signal is obtained. The position is a little different for targets at 8 Km range. A reflection of pulse 12 is shown at line *f* and this pulse will pass through the first receiving channel which is operative for ranges of 8 Km. A delayed output will therefore be received at terminal 11 and this is shown at line *g*. Although the pulse compression receiving channel is intended to be inoperative for targets at 8 Km range, the length of the swept pulse 13 is, in the present example sufficiently great that the tail end of a reflected pulse from a target at 8 Km is still being received when the front end of a reflected pulse would arrive from a target at 10 Km range, at which time the second receiving channel switches on. The tail end of the 8 Km pulse therefore passes through the pulse compression receiver, portion $t_4$ of the front end being effectively gated out. This is shown at line *h*. The portion of the 8 Km pulse which passes the disperser 8 is partially compressed to provide an output pulse, shown at line *j* which is coincident on the P.P.I. with the output pulse, shown at line *g*, from the first channel.

At ranges greater than 10 Km, the first receiving channel is closed by the gate 3 and only compressed signals are received by the P.P.I. display.

Although for the purposes of explanation, it has been assumed that the change over from the non-swept pulse radar to the pulse compression radar occurs for targets at a range of 10 Km, it is to be understood that this choice is purely arbitrary and in no way limiting on the scope of the invention claimed.

I claim:

1. A radar system comprising a transmitter means for transmitting two consecutive radar pulses, which are separated by a predetermined interval only one of said pulses being frequency swept and a receiver having a first channel means for processing non-swept pulses and providing signals indicative of targets in a first range zone and a second channel means for processing the swept pulses and providing a pulse compressed signal indicative of targets in a second range zone.

2. A radar system as claimed in claim 1 wherein said first channel means includes means to establish said first range zone to include all ranges from zero up to a predetermined range, and said second channel means includes means to establish said second range zone to include all ranges greater than said predetermined range up to a predetermined maximum range of observation.

3. A receiver for use in a radar system in which two radar pulses are transmitted in consecutive fashion separated by a predetermined interval only one of said pulses being frequency swept, said receiver comprising a first channel means for processing non-swept pulses and providing signals indicative of targets in a first range zone, and a second channel means for processing swept pulses and providing a pulse compressed signal indicative of targets in a second range zone.

4. A receiver as claimed in claim 3 in which each channel means is provided with switching means in the signal path so as to ensure that each channel means only processes signals received from targets in the appropriate range zone.

5. A receiver as claimed in claim 3 including R.F. stages which are common to said first and second channel means.

6. A receiver as claimed in claim 3 including means for combining the signals provided by the first and second channel means to provide a single output signal.

7. A receiver as claimed in claim 6 including means for delaying the signal in the first channel means so that the single combined output signal provides a continuous range indication.

\* \* \* \* \*